United States Patent
Commeville et al.

(10) Patent No.: US 7,055,863 B1
(45) Date of Patent: Jun. 6, 2006

(54) CONTAINMENT DEVICE AND METHOD FOR HOSE BIBS AND THE LIKE

(76) Inventors: Marc J. Commeville, 24 Hampshire Ct., Noblesville, IN (US) 46060; Corey D. Louks, 18739 Gretna Green La., Nobelsville, IN (US) 46060

( * ) Notice: Subject to any disclaimer, the term of this patent is extended or adjusted under 35 U.S.C. 154(b) by 0 days.

(21) Appl. No.: 10/748,768

(22) Filed: Dec. 30, 2003

(51) Int. Cl.
*F16L 5/00* (2006.01)

(52) U.S. Cl. .......................... 285/46; 285/64; 137/359; 52/220.8

(58) Field of Classification Search ............... 285/8, 285/240, 64, 46, 205; 137/359; 52/220.8
See application file for complete search history.

(56) References Cited

U.S. PATENT DOCUMENTS

| | | | | |
|---|---|---|---|---|
| 35,515 A | * | 6/1862 | Gibson et al. ................ | 285/46 |
| 536,801 A | * | 4/1895 | Gaghan ....................... | 137/360 |
| 1,115,696 A | * | 11/1914 | Linbarger .................... | 285/64 |
| 4,473,244 A | | 9/1984 | Hill | |
| 5,419,362 A | | 5/1995 | Blackaby | |
| 5,803,508 A | * | 9/1998 | Lowella ....................... | 285/64 |
| 5,964,246 A | | 10/1999 | Meeker | |
| 6,378,910 B1 | * | 4/2002 | Maiman ....................... | 285/46 |
| 6,543,186 B1 | * | 4/2003 | Gilleran ....................... | 52/35 |
| 6,668,852 B1 | * | 12/2003 | Williamson ................. | 137/312 |

FOREIGN PATENT DOCUMENTS

| | | | |
|---|---|---|---|
| JP | 2-46389 | * | 2/1990 |
| JP | 2-97795 | * | 4/1990 |

* cited by examiner

*Primary Examiner*—James M. Hewitt
(74) *Attorney, Agent, or Firm*—Woodard, Emhardt, Moriarty, McNett & Henry, LLP

(57) ABSTRACT

A hose bib containment device having a back portion, middle portion, and a front portion. The back portion can be secured to an exterior wall of a building, and mortar and bricks can be installed around the front portion side and at least part of the middle portion. The containment device includes a tube that allows a hose bib to be inserted therein and guided into an opening on the exterior wall. When the containment device is used, the hose bib can be installed after the bricking process has been completed. Once installed, the hose bib blends in with and is flush with the surrounding bricks that are held in place with mortar. Repair and replacements can be made to the hose bib without disturbing the bricks and mortar.

26 Claims, 10 Drawing Sheets

CONTAINMENT DEVICE AND METHOD FOR HOSE BIBS AND THE LIKE

TECHNICAL FIELD OF THE INVENTION

The present invention relates to plumbing devices and, in particular, to a novel hose bib containment device and method.

BACKGROUND OF THE INVENTION

In residential and commercial construction, hose bibs (external faucets) are installed on one or more exterior walls to provide access to a water supply from outside the building. With brick exteriors, installation and maintenance of hose bibs and the surrounding brick is difficult. In a typical installation, a hose bib goes through a drilled hole in a bandboard at the plumbing rough stage. A mason then bricks up the outside around the hose bib. Mortar is placed around the bib pipe to hold it in place next to the surrounding bricks. On some occasions, brick or wood pieces are used with the mortar to surround the hose bib to help improve the appearance. Laying brick around the hose bib is difficult and sometimes results in physical damage to the hose bib during the bricking process. For example, the gravity drain feature of the hose bib is sometimes damaged during this process. After bricking around the hose bib, it is common for the hose bib to be insecure or loose such that it wiggles when used.

Repairing or replacing a hose bib at a later date is also difficult. Since the hose bib is surrounded by brick and mortar, removal of the hose bib can be difficult. For example, the plumber may have to pound out the hose bib from inside (which normally dislodges the mortar therearound) so he can saw off the outside portion and push the rest back through the hole to the inside. At that point, there is a big hole in the mortar and no way to screw a new hose bib into the brick. There is therefore a need for a new and improved device and method for aiding the installation and maintenance of hose bibs. The present invention is directed to meeting these and other needs.

SUMMARY OF THE INVENTION

One object of the present invention is to provide a novel device for aiding the installation of hose bibs.

Another object is to provide a novel device and method for aiding the installation and maintenance of hose bibs.

In one embodiment, the invention is a hose bib containment device that comprises a back portion, a middle portion, and a front portion. The back portion can be secured to an exterior wall of a building, and mortar and bricks can be installed around the front portion sides and at least part of the middle portion. The containment device includes a hole or tube that allows a hose bib to be inserted therein and guided into an opening on the exterior wall. When the containment device is used, a hose bib can be installed after the bricking process has been completed. Once installed, the hose bib blends in with and is flush with the surrounding bricks that are held in place with mortar. Repair and replacements can be made to the hose bib without disturbing the bricks and mortar.

In one embodiment, an apparatus is disclosed that comprises: a back portion constructed to be secured to an exterior wall of a building; a front portion having a plurality of sides and a face; a middle portion having a plurality of sides, the middle portion being coupled to the back portion and the front portion at an angle such that a junction circumference is greater at the back portion than the front portion; and wherein the front, middle, and back portions have a hole for receiving a hose bib, said hole allowing the hose bib to be inserted into the face of the front portion, through the middle and back portions, and through an opening in the exterior wall to an interior area of the building having a water supply.

In another embodiment, a method is disclosed that comprises: securing a hose bib containment device to an exterior wall of a building, said exterior wall having an opening extending to an interior wall for access to a water supply; placing mortar and bricks around the hose bib containment device so that the bricks are substantially flush with a face of the front portion; installing a hose bib through a hole in the hose bib containment device and into the opening extending to the interior wall; securing the hose bib to the hose bib containment device; and connecting the hose bib to the water supply.

In yet another embodiment, a construction is disclosed that comprises: a hose bib containment device secured to an exterior wall of a building; bricks and mortar fixed on the exterior wall surrounding the containment device, said bricks being substantially flush with a face of containment device; and a hose bib extending through the containment device and through an opening in the exterior wall to an interior area of the building having a water supply.

DETAILED DESCRIPTION OF THE PREFERRED EMBODIMENTS

Figure 1:
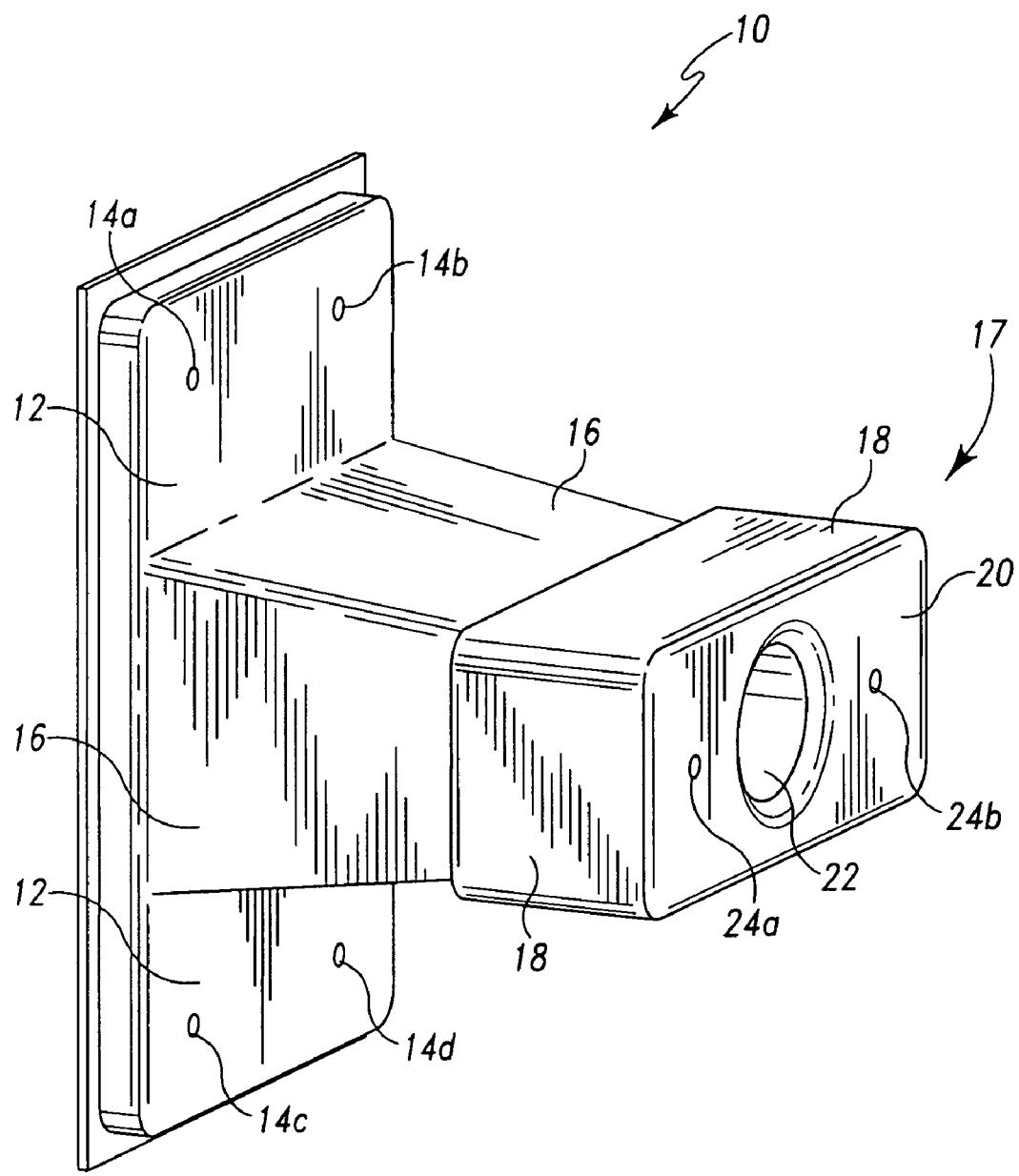
FIG. 1 is a side perspective view of a hose bib containment device of one embodiment of the present invention.
Figure 2:
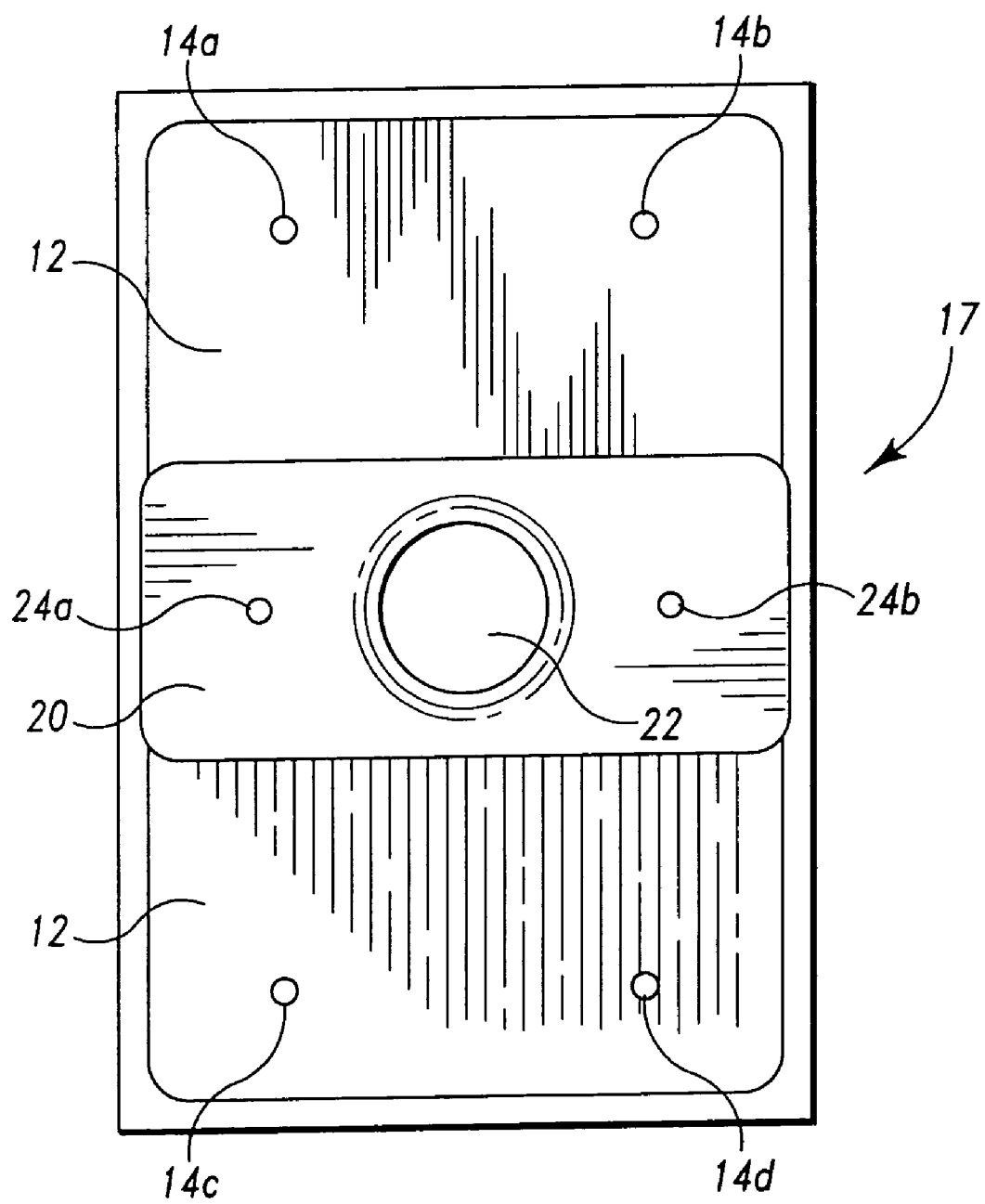
FIG. 2 is a front elevational view of the hose bib containment device of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The present invention provides a method and apparatus for a hose bib containment device allowing for installation and maintenance of hose bibs.

Figure 3:
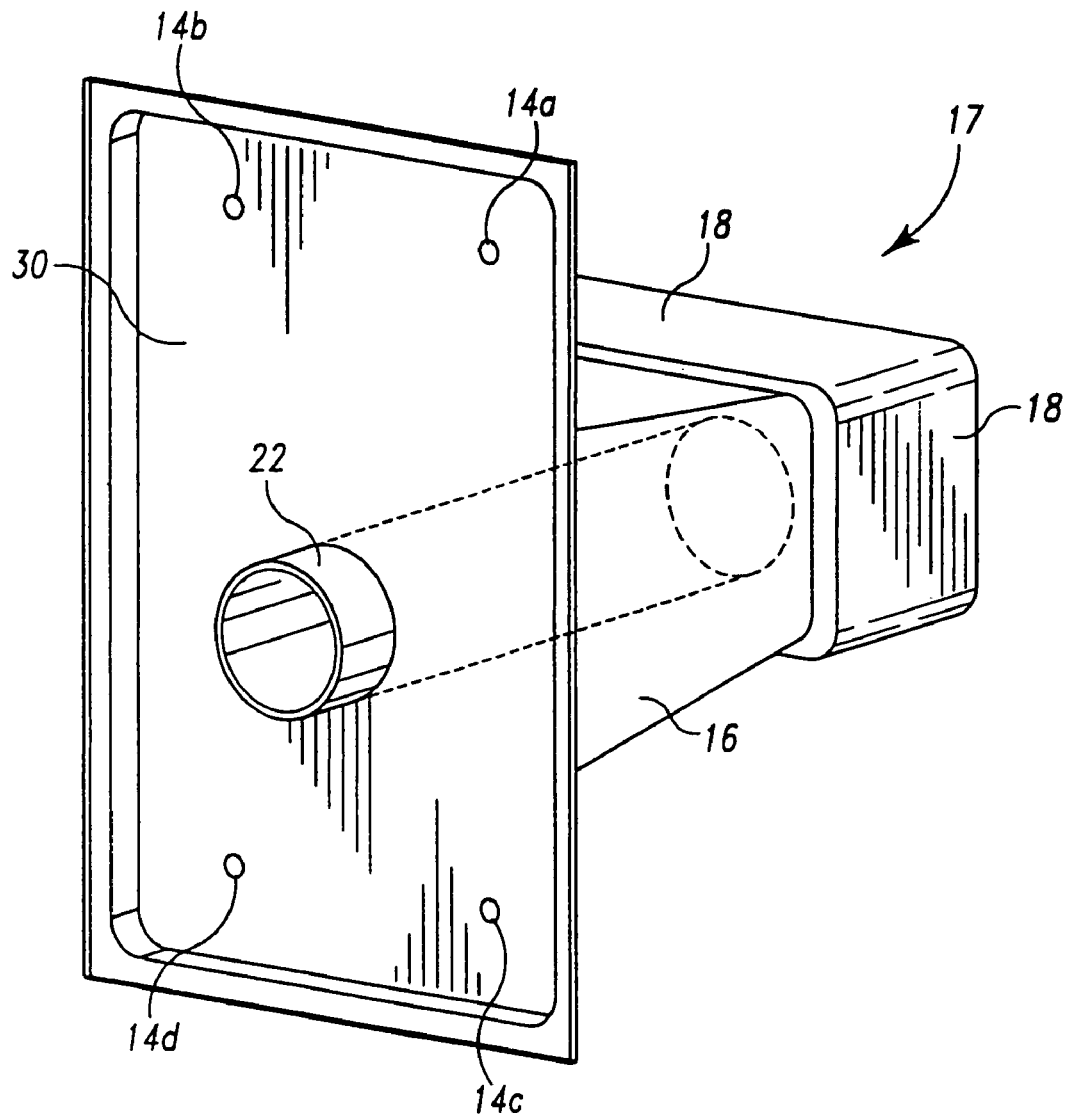
FIG. 3 is a rear perspective view of the hose bib containment device of FIG. 1.
Figure 4:
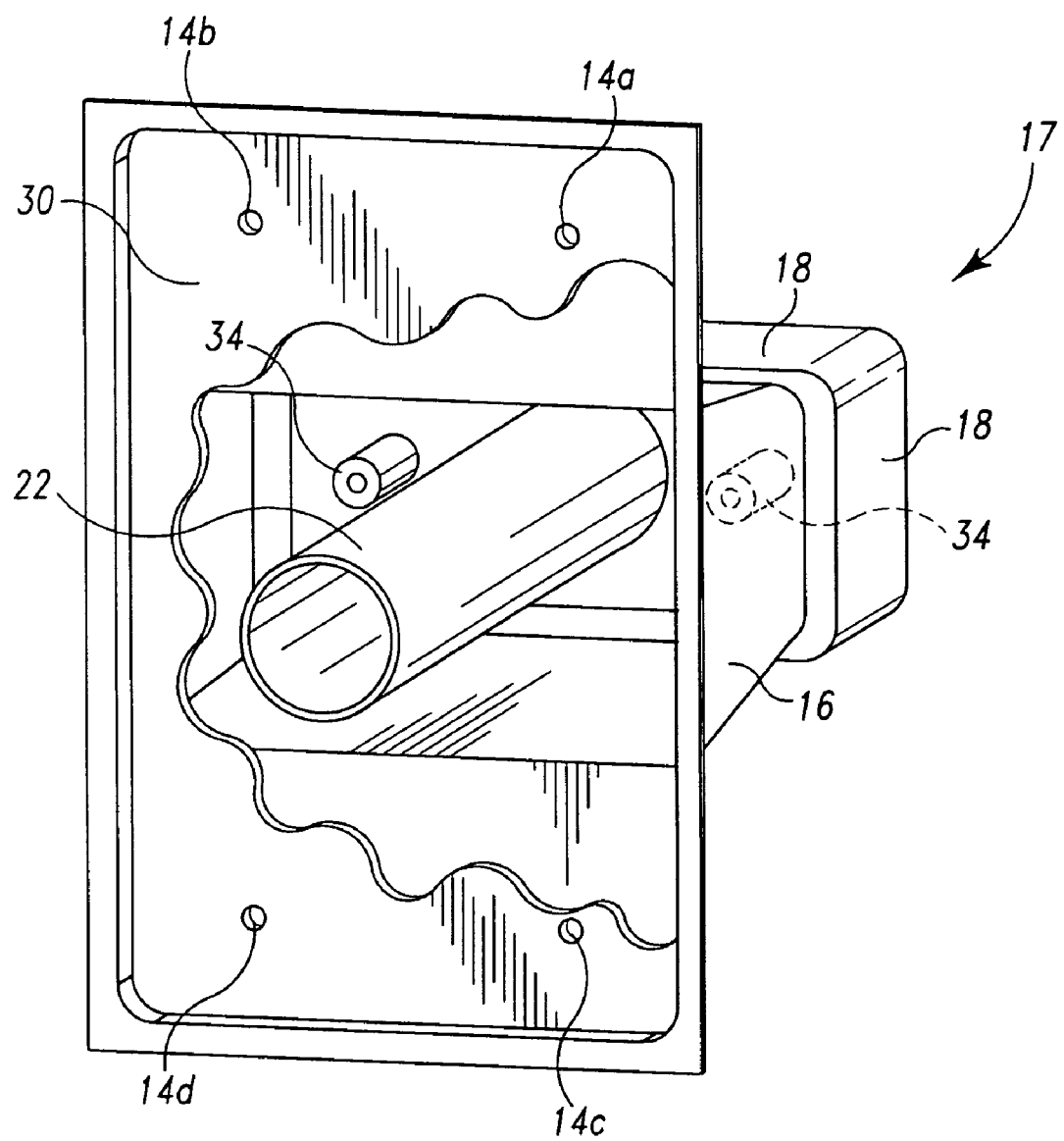
FIG. 4 is a rear cut-away perspective view of the hose bib containment device of FIG. 1.
Figure 5:
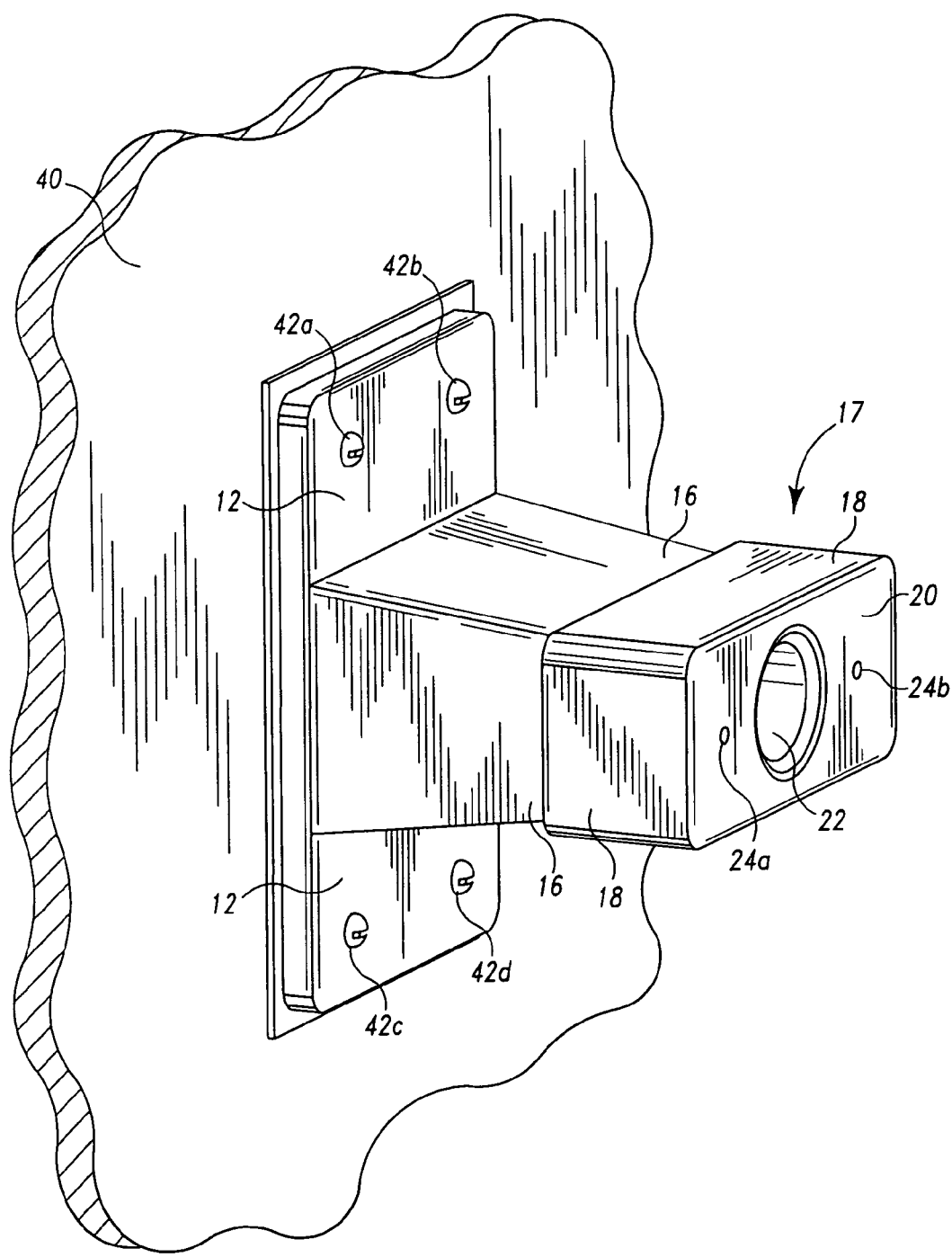
FIG. 5 shows a side perspective view of the hose bib containment device of FIG. 1 mounted on a wall.

Reference will now be made to FIGS. 1–8, with the same reference numerals used to refer to the same parts throughout. A preferred embodiment hose bib containment device 10 includes back portion 12 that allows device 10 to be mounted onto an exterior wall. Screw holes 14a–14d can be used to aid in securing back portion 12 to the exterior wall, as one non-limiting example. Screw holes 14a–14d can be formed at the time of manufacturing, drilled on the job site, or drilled at some other time. Alternatively or additionally, other means for securing back portion 12 to an exterior wall can also be used as is known in the art. FIG. 5 shows an example of securing containment device 10 to exterior wall 40 using screws 42a–42d.

Middle portion 16 includes multiple sides and is coupled to back portion 12. Front portion 17 has multiple sides 18 and face 20, with sides 18 of front portion 17 being coupled to middle portion 16. In one embodiment, middle portion 16 has four sides, and front portion 17 has four sides 18 and face 20. A hole 22 extends through front portion 17, middle portion 16, and back portion 12. Hole 22 can serve as a guide for aiding in installation of a hose bib, such as hose bib 50 shown in FIG. 6, into an exterior wall. As shown in FIGS. 1 and 3, hole 22 in one embodiment is defined by a tube that extends from front portion 17, through middle portion 16 and back portion 12. As shown on FIG. 3, the tube can extend outwardly on rear side 30 of back portion 12 so that the outward part of the tube can be inserted into an opening of the exterior wall as a guide. Other hole variations are also possible, such as simply having a hole on front portion 17 and a corresponding hole on back portion 12 to allow hose bib 50 to be fed through.

Figure 6:
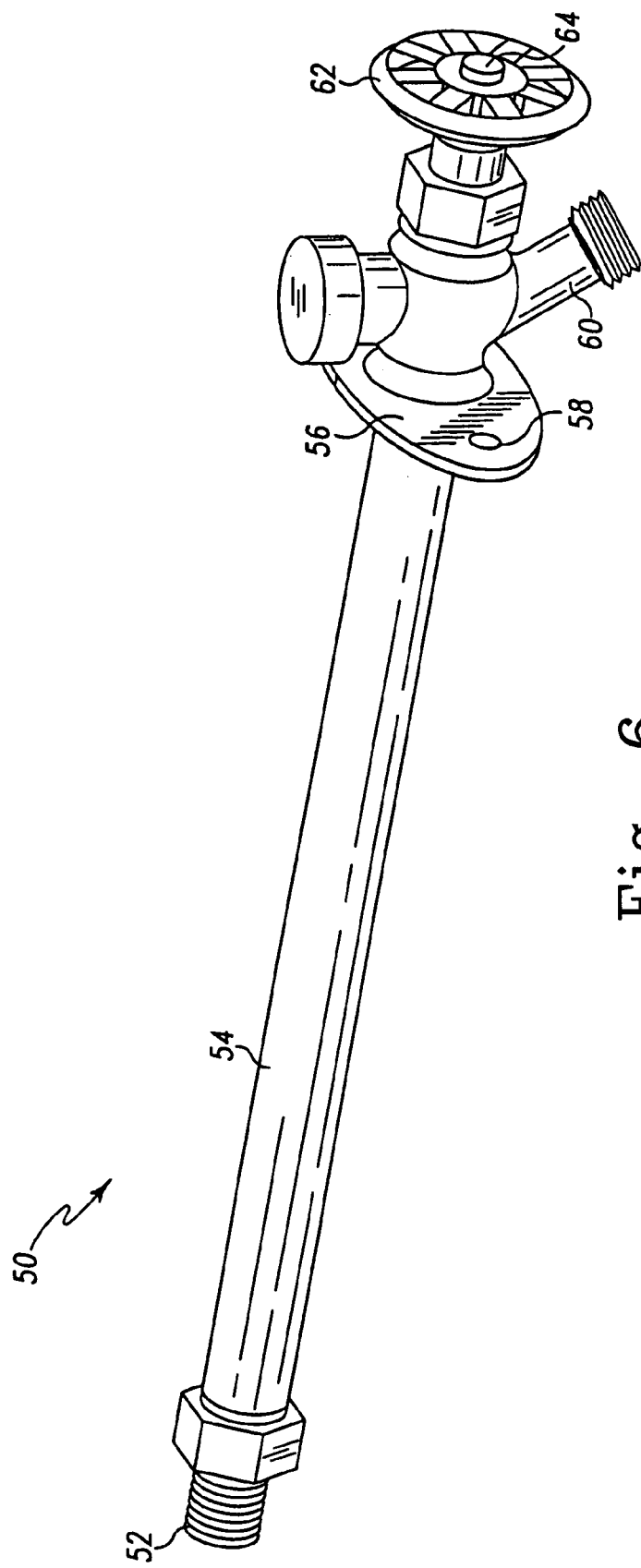
FIG. 6 is a side perspective view of one embodiment of a prior art hose bib that can be used with the hose bib containment device of the present invention.

As shown in FIG. 6, hose bib 50 includes a connecting means 52 for connection to a water supply. Pipe 54 is coupled to connecting means 52, and extends to front face plate 56. Face plate 56 in one embodiment includes screw holes 58 to allow for securing hose bib 50 to front portion 17, such as through holes 24a and 24b of front portion 17. Hose bib 50 also includes water spout 60, handle 62, and handle securing means 64, such as a bolt. Other variations of hose bibs can also be used with the present invention, since hose bib 50 merely serves as an example to aid in understanding how hose bib containment device 10 and its related methods operate. As shown in FIGS. 1 and 4, screw holes 24a and 24b can have screw receiving means 34 that are formed as part of the molded hose bib, that are formed of a piece of wood, or other variations that would allow hose bib 50 to be secured on front portion 17 as is known in the art.

Figure 7:
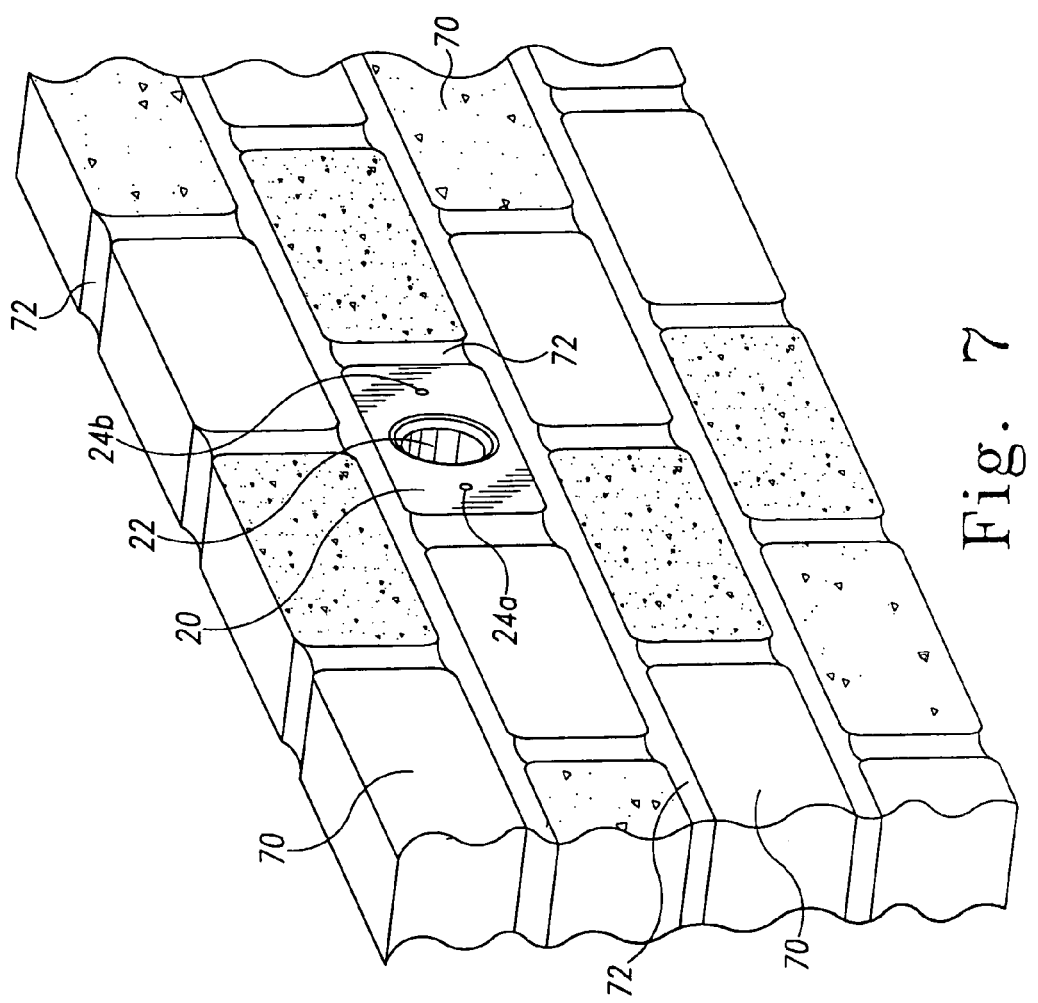
FIG. 7 is a perspective view illustrating the hose bib containment device of the present invention installed in a masonry wall.
Figure 8:
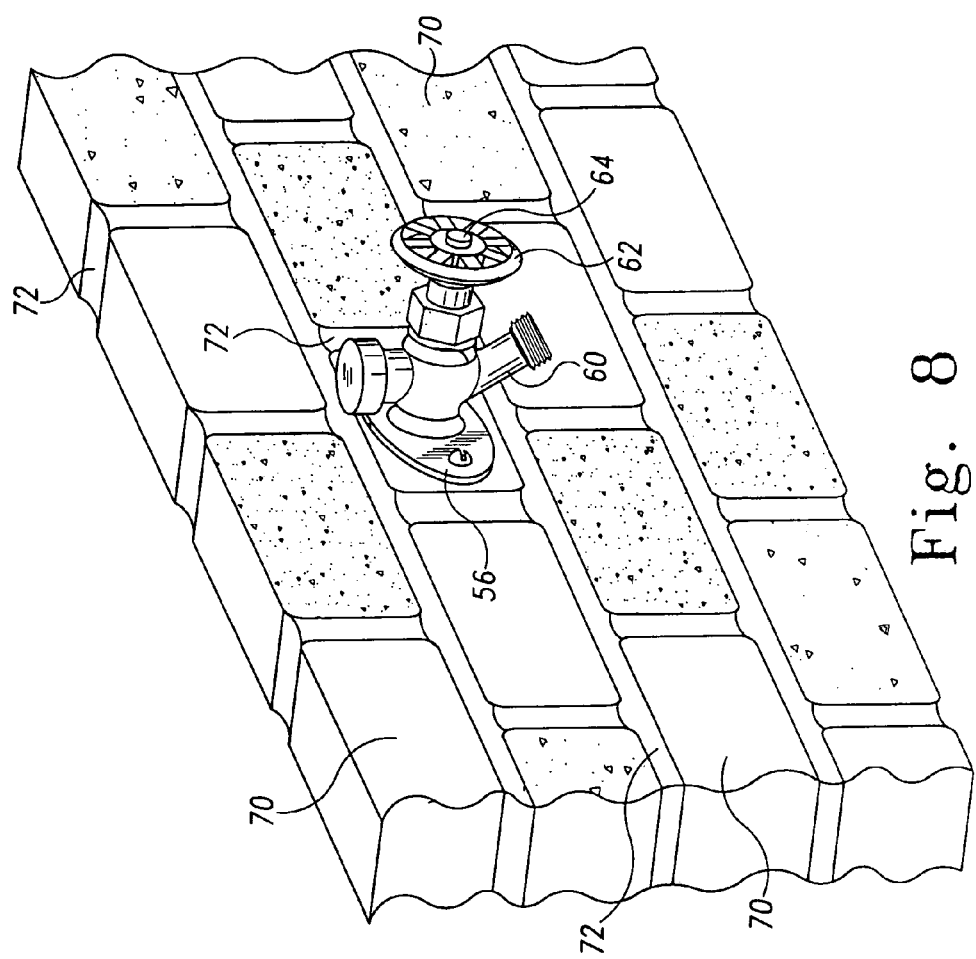
FIG. 8 is a perspective view illustrating a hose bib installed in the hose bib containment device of the present invention installed in a masonry wall.

Hose bib containment device 10 is constructed to allow mortar to be placed around sides 18 of front portion 17 and part of middle portion 16 so that surrounding bricks can be installed flush with face 20 of front portion 17. For example, middle portion 16 can be angled from back portion 12 to front portion 17, with the junction circumference at back portion 12 being larger than the junction circumference at front portion 17. This angled design can help ensure proper installation of the mortar and surrounding brick. In such a design, mortar must be placed on side 18 and on a part of corresponding section of middle portion 16 that dips downward in order to generate a properly sized mortar joint having a level surface on which to place the brick. In one embodiment, front portion 17 is similar in size to a piece of brick. Alternatively or additionally, middle portion 16 is constructed with sufficient depth to allow some air space between the brick and the exterior wall. FIG. 7 illustrates an example of what bricks 70 and mortar 72 might look like installed around containment device 10 without hose bib 50 installed. Only face 20 of front portion 17 is visible, and aesthetically front portion 17 blends in well with bricks 70 and mortar 72. FIG. 8 illustrates an example of how hose bib 50 might look when installed in containment device 10 in its completed form surrounded by bricks 70 and mortar 72. Hose bib 50 can be secured to front portion 17 using screw holes 24a and 24b. Other securing means could also be used. Aesthetically, front portion 17 and hose bib 50 blend in well with the surrounding bricks 70 and mortar 72.

In one embodiment, hose bib containment device 10 is constructed as a one-piece unit by using a mold injection process. Containment device 10 can be made out of a molded plastic material such as BASF's Centrex® material, as one non-limiting example. Various other types of weather-resistant materials could also be used as would be apparent to one skilled in the art. Alternatively or additionally, all or part of containment device 10 can be made in a color that matches or would otherwise be aesthetically appealing compared to the brick and/or mortar color of the building. In one embodiment, at least face 20 of front portion 17 is made in a color that matches or would look aesthetically appealing with the brick and/or mortar. In another embodiment, the entire containment device 10 is made in that matching or aesthetically appealing color. One purpose of using a matching color on at least face 20 of front portion 17 is so that when installed, containment device 10 fits in well with the surrounding brick and mortar in an aesthetically appealing manner. One of ordinary skill in the art will appreciate that containment device 10 could be made in one or more different shapes, sizes, pieces and/or arrangements than those described herein and still be within the spirit of the invention.

Figure 9:
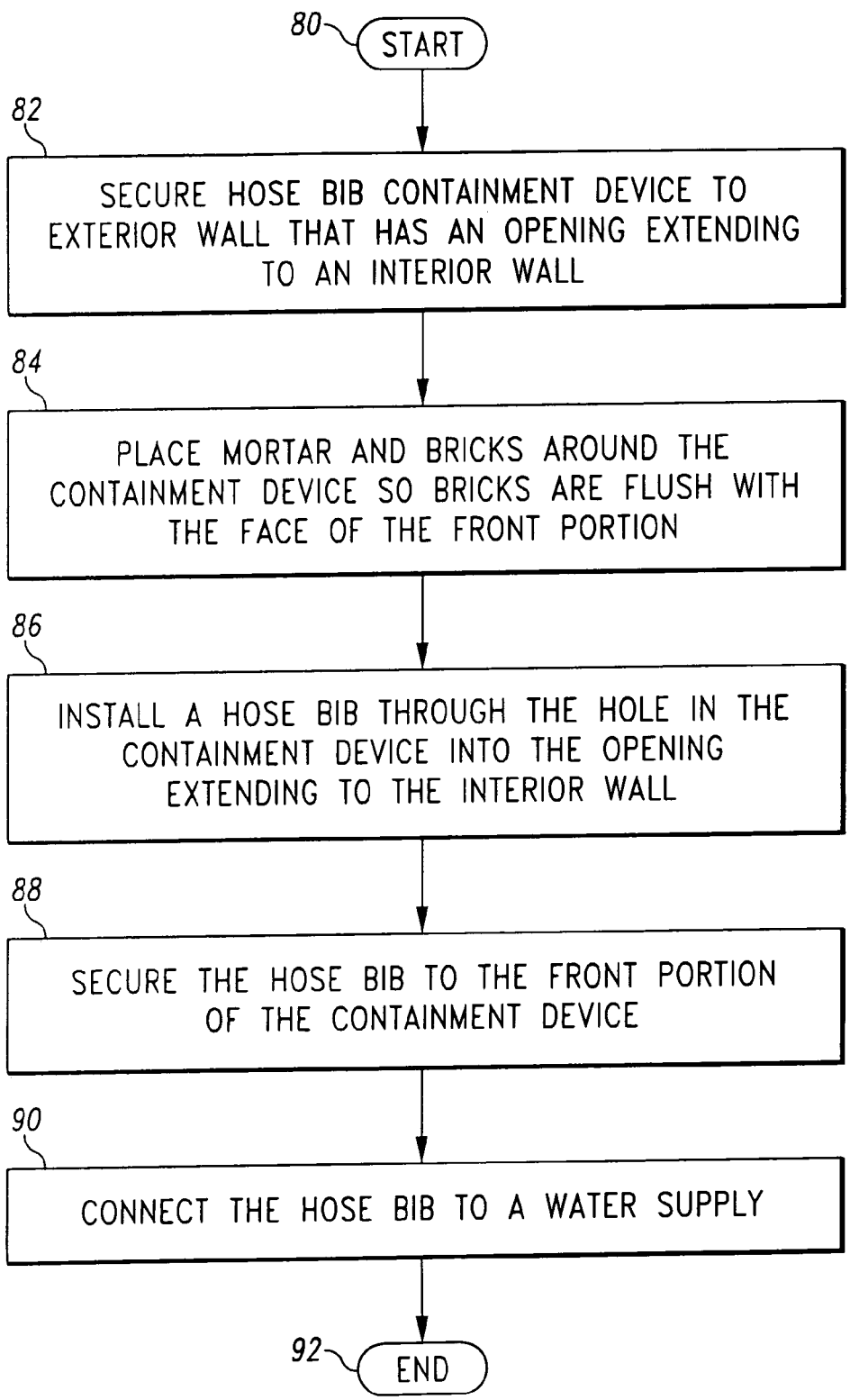
FIG. 9 is a flow diagram illustrating the stages involved in installing the hose bib containment device of FIG. 1.
Figure 10:
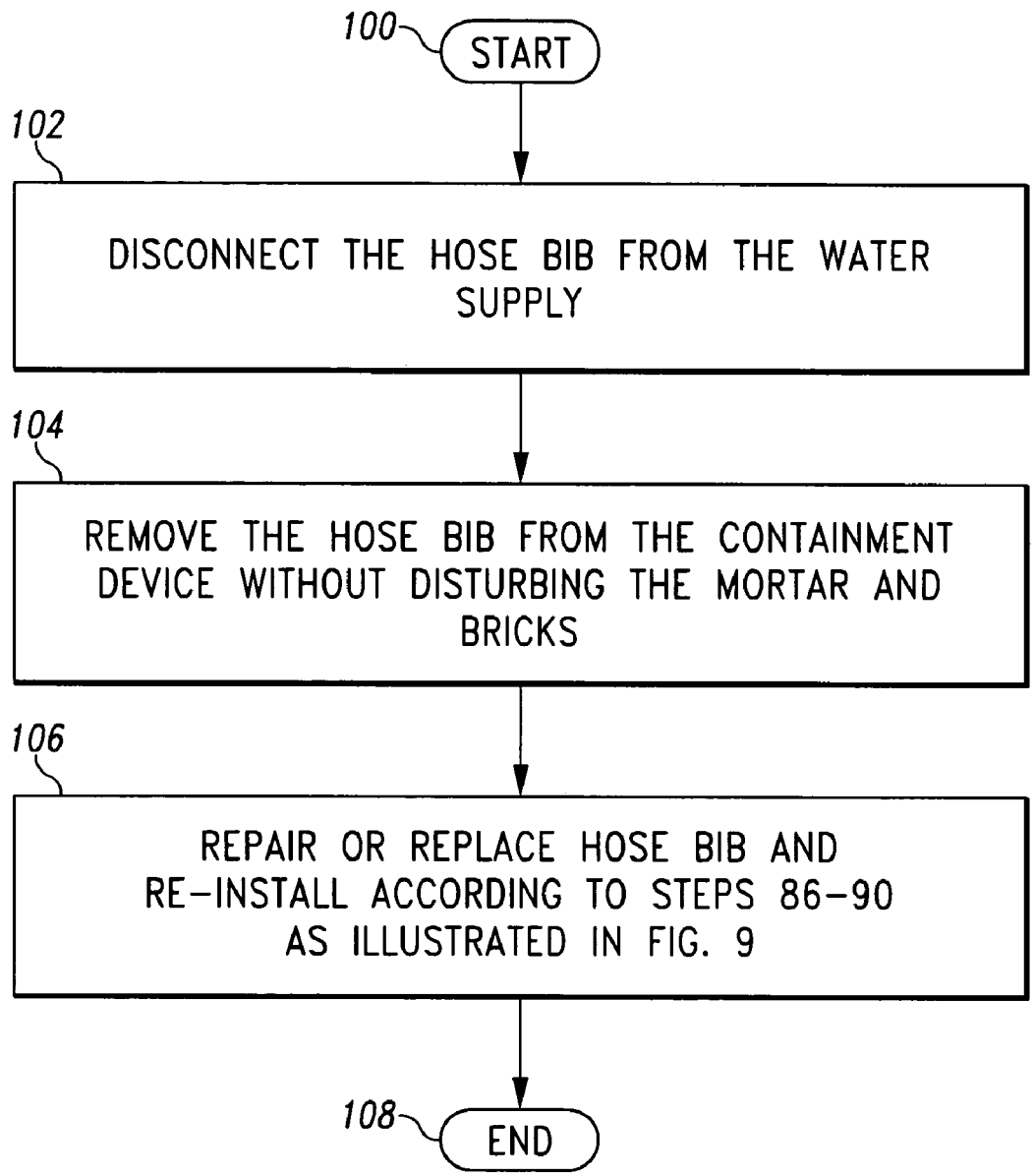
FIG. 10 is a flow diagram illustrating the stages involved in replacing a hose bib installed with the hose bib containment device of FIG. 1.

With continuing reference to FIGS. 1–8, reference will now be made to FIGS. 9–10. FIGS. 9–10 illustrate the stages involved in installing the hose bib containment device illustrated in FIGS. 1–8 and for replacing a hose bib installed therein. As shown in FIG. 9, the installation process 80 begins by securing hose bib containment device 10 to exterior wall 40 that has an opening extending to an interior wall for access to a water supply (stage 82). Mortar and bricks are then placed around sides 18 of front portion 17 and around part of sides of middle portion 16 so that the bricks are flush with face 20 of front portion 17 (stage 84). In one embodiment, a gap is left between bricks and exterior wall 40 to facilitate the flow of air. See FIG. 7 for an example of how front portion 17 might look with bricks and mortar installed around it.

Hose bib 50 is installed through hole 22 into the opening on exterior wall 40 that extends to the interior wall (stage 86). Hose bib 50 is secured to front portion 17 of the hose bib containment device (stage 88), such as by inserting screws into screw holes 58 of hose bib 50 and through screw holes 24a and 24b of face 20, as one non-limiting example. In one embodiment, screw 64 of hose bib handle 62 may need to be removed to allow easier access to screw hole 58. Hose bib connector end 52 can then be connected to the interior water supply (stage 90), and used as a source of water from the exterior of the building. See FIG. 8 for an example of how hose bib 50 might look when installed according to this process. Process 80 then ends at stage 92.

As shown in FIG. 10, replacement process 100 begins by disconnecting hose bib 50 from the water supply (stage 102), such as when a repair or replacement needs to be made. Hose bib 50 can be removed from hose bib containment device 10 without disturbing the mortar and bricks (stage 104). With hose bib 50 removed from containment device 10, hose bib 50 can be repaired or replaced if necessary (stage 106). Once the repaired or replaced hose bib is ready to be re-installed into containment device 10, stages 86–90 of installation process shown in FIG. 9 can be repeated. Process 100 then ends at stage 108.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:
  a back portion constructed to be secured to an exterior wall of a building;
  a front portion having a plurality of sides and a face;
  a middle portion having a plurality of sides, the middle portion being coupled to the back portion and the front portion at an angle such that a junction circumference is greater at the back portion than the front portion;
  wherein the front, middle, and back portions have a hole for receiving a hose bib, said hole allowing the hose bib to be inserted into the face of the front portion, through the middle and back portions, and through an opening in the exterior wall to an interior area of the building having a water supply;
  wherein the middle portion extends along a longitudinal axis of the hose bib a greater length than the front portion or the back portion; and
  wherein the front and middle portions are constructed to allow mortar to be placed around the sides of the front portion and part of the middle portion so that a plurality of bricks can be installed flush with the face of the front portion.

2. The apparatus of claim 1 wherein the back, middle, and front portions are constructed as a one-piece unit by using a mold injection process.

3. The apparatus of claim 1, wherein the back, middle, and front portions are made of a molded plastic material.

4. The apparatus of claim 1, wherein a color of at least the face of the front portion matches a brick color.

5. The apparatus of claim 1, wherein a color of at least the face of the front portion matches a mortar color.

6. The apparatus of claim 1, wherein the back portion has a plurality of screw holes to aid in securing the back portion to the exterior wall.

7. The apparatus of claim 1, wherein the middle portion is constructed to allow an air space to be left between the plurality of bricks and the exterior wall after installation of the bricks.

8. The apparatus of claim 1, wherein the angle of the middle portion allows a mortar joint to be sized so that a plurality of bricks can be installed flush with the face of the front portion.

9. The apparatus of claim 1, wherein the front portion is constructed to allow the hose bib to be secured to the front portion.

10. The apparatus of claim 9, wherein the front portion has a plurality of screw holes to aid in securing the hose bib to the front portion.

11. The apparatus of claim 1, wherein the front portion is similar in size to a piece of brick.

12. The apparatus of claim 1, wherein the hole is defined by a tube that extends through the front, middle, and back portions to serve as a guide for inserting the hose bib into the opening of the exterior wall.

13. The apparatus of claim 12, wherein the tube extends outwardly from the back portion so that an outward part of the tube can be inserted into the opening of the exterior wall.

14. A method comprising:
  securing a hose bib containment device including a front portion, a middle portion, and a back portion to an exterior wall of a building, wherein the middle portion extends in a substantially perpendicular direction away from the exterior wall in a length greater than the front portion or the back portion, said exterior wall having an opening extending to an interior wall for access to a water supply;
  placing mortar and bricks around the hose bib containment device so that the bricks are substantially flush with a face of the front portion;
  installing a hose bib through a hole in the hose bib containment device and into the opening extending to the interior wall;
  securing the hose bib to the hose bib containment device; and
  connecting the hose bib to the water supply.

15. The method of claim 14, further comprising:
  disconnecting the hose bib from the water supply; and
  removing the hose bib from the hose bib containment device without disturbing the mortar and bricks.

16. The method of claim 14, wherein the hose bib containment device is secured by inserting a plurality of screws into a plurality of screw holes located in the back portion and drilling the screws into the exterior wall.

17. A construction comprising:
  a hose bib containment device secured to an exterior wall of a building, the hose bib containment device including a front, middle, and back portion, wherein of the middle portion extends away from the exterior wall in a direction substantially perpendicular to the exterior wall in a length greater than the front portion or the back portion;
  bricks and mortar fixed on the exterior wall surrounding the containment device, said bricks being substantially flush with a face of the containment device; and
  a hose bib extending through the containment device and through an opening in the exterior wall to an interior area of the building having a water supply.

18. The construction of claim 17, wherein the hose bib containment device is made of a molded plastic material.

19. The construction of claim 18, wherein the front portion is similar in size to the bricks.

20. An apparatus comprising:
  an exterior wall of a building;
  a hose bib containment device operatively coupled to said exterior wall, said containment device including a front portion having a face, a middle portion, and a back portion, wherein the middle portion extends in a substantially perpendicular direction away from said exterior wall a greater length than the front portion or the back portion;
  a plurality of bricks placed around the hose bib containment device, wherein a surface of said bricks is substantially flush with the face of the front portion; wherein said bricks and said exterior wall define an air space therebetween.

21. The apparatus of claim 20 wherein the back, middle, and front portions are constructed as a one-piece unit by using a mold injection process.

22. The apparatus of claim 20, wherein the back, middle, and front portions are made of a molded plastic material.

23. The apparatus of claim 20, wherein a color of at least the face of the front portion matches a brick color.

24. The apparatus of claim 20, wherein a color of at least the face of the front portion matches a mortar color.

25. The apparatus of claim 20, wherein the back portion has a plurality of screw holes to aid in securing the back portion to the exterior wall.

26. The apparatus of claim 20, wherein the front portion is similar in size to one of said plurality of bricks.

* * * * *